Oct. 4, 1949. F. KAUTZ Re. 23,153
FRAMING ELEMENTS
Original Filed Jan. 15, 1941 2 Sheets-Sheet 1
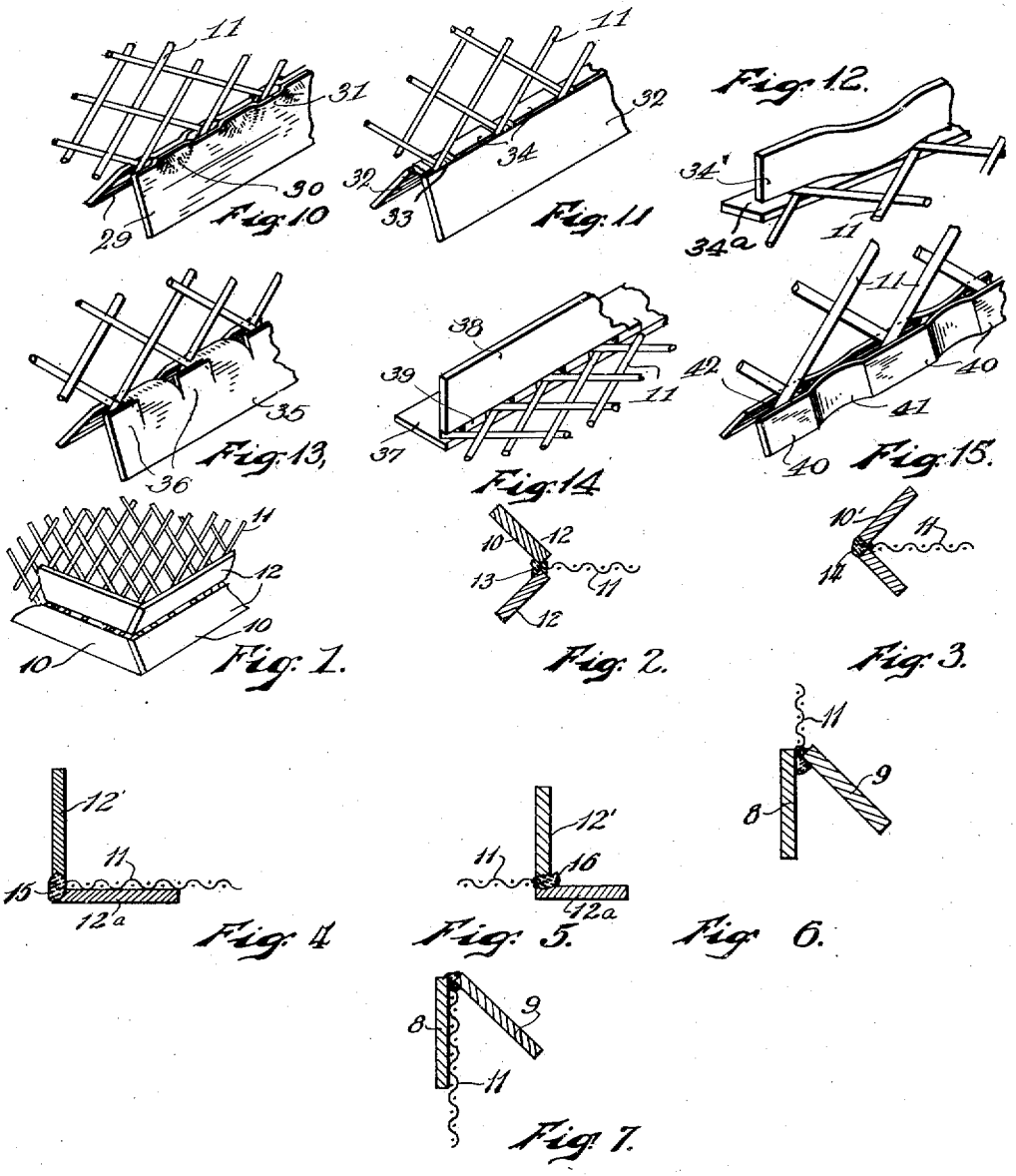
INVENTOR:
FREDERICK KAUTZ,
BY:
Christen R. Nielsen
ATTORNEY.

FRAMING ELEMENTS

Original Filed Jan. 15, 1941 2 Sheets-Sheet 2

Inventor

FREDERICK KAUTZ

By Christian R. Nielsen

Attorney

Reissued Oct. 4, 1949

Re. 23,153

UNITED STATES PATENT OFFICE 23,153

FRAMING ELEMENTS

Frederick Kautz, Glenolden, Pa.

Original No. 2,412,618, dated December 17, 1946, Serial No. 374,568, January 15, 1941. Application for reissue December 16, 1947, Serial No. 791,973

15 Claims. (Cl. 189—84)

The invention relates to the production of a material suitable for use in screens, framing and frame structures, enclosures, partitions, bins, panels and guards in various structures, and particularly with relation to framing elements for meshed materials of various kinds. Thus, my invention is applicable to production of screens in a novel form, suitable for use as screens in screening or separating and classifying material, or for screens adapted to function to enclose small birds, animals or the like, or for fencing.

The invention particularly aims to present such structure which may also be used to good advantage in the framing of building structures so that units of my invention may be set up without the use of studding necessarily, in some situations, and if not used as an open mesh partition, they serve for the application of plaster, stucco, and the like, to complete a wall, either as a partition or as an external bearing wall. It is a particular aim of the invention to present structural material adapted to be used as an expanded metal support for plaster and the like, or without the application of such plastic, to serve as fencing or as a separating screen for various purposes.

Another important aim of the invention is to present a structure element of this kind which is especially adapted to use in the construction of buildings, either commercial or domestic, where shelving is to be put in place, so that the expanded metal or corresponding unit may be built into a wall or partitioning screen, and at the same time supply shelf support. Another important aim of the invention is to present a structure element adapted to use in producing steel reinforced concrete slabs or the like, with novel advantages. A further additional purpose of the invention is to present a unit of material of this kind adapted to use as a combined mold, concrete slab or wall reinforcement, and permanent edge facing for finished work whereby it is protected from chipping, and whereby also if desired, two or more units formed with my invention may be connected together, if desired, by fastenings engaged between the mold or edge facing elements.

While I am aware that wire screens of corresponding material have been heretofore framed by panel-like structural steel members and the like, there has heretofore been difficulty in effecting a satisfactory union or securement of the screen material to the metal framing, especially by welding, on account of the difference in heat diffusion of the screen material and frame material, and it is an important aim of my invention to present a manner of construction which will enable the production of screen or expanded metal structural members having panel form or other edging or stiffening of heavy structural angle steel devices or their equivalents attaining many novel advantages over prior structure or material, and having great strength and durability, as well as simplifying steps required in manufacture.

It has also been an aim to attain these improvements while at the same time reducing the cost of such materials. A further aim is to improve the construction of the units to the end that they may be very quickly assembled with a minimum of experience required on the part of workmen, applying or erecting the material.

It is an important aim of the invention to present structural material of this kind which will afford a maximum strength and rigidity in walls, fences, partitions, and otherwise, incident to its use.

An object of the invention incident to production of this material is to enable the weld to be made in such manner that the welded material will not be exposed saliently, and therefore, in many situations, will involve a minimum requirement of cleaning, and also will be liable in a minimum degree to corrosion. A further aim is to present a novel structural unit adapted to be assembled in juxtaposition with other like units, to enable the drawing of adjacent units in a novel way to form a complete structure of high strength and good appearance.

A further important aim of the invention is to present a structural unit of this kind which will be extremely light in weight, yet without sacrificing essential strength for the uses contemplated. It is an important aim of the invention to present a novel means for attaching screen material to a frame piece or edging, whereby the welding of the screen material or expanded metal to such framing piece may be effected without weakening the screen at the junction with the weld, without burning the screen material, and in such manner that a highly secure attachment of the screen material is effected.

Additional objects, advantages and features of the invention reside in the construction, arrangement and combination of parts involved in the embodiment of the invention, as will be more readily understood from the following description and accompanying drawings, wherein Figure 1 is a fragmentary view of a structural element adapted to many and various uses, as heretofore set forth, and as may be additionally understood from the description thereof and its adaptability to various uses.

Figure 2 is a cross section thereof.

Figure 3 is a similar cross section, showing a modification of the arrangement of the edge member of the unit with respect to the screen material.

Figure 4 is a similar fragmentary section showing a further arrangement of the screen material with respect to the edging member.

Figure 5 is a further modification of the relation of the screen to the edge member, the foregoing five views illustrating the use of simple angle structural iron or steel members.

Figures 6 and 7 are horizontal cross sections of modifications illustrated in Figures 1 and 2.

Figure 10 is a similar view showing another manner of forming the stiffening stock to receive the screen for producing the last named article.

Figures 11, 12 and 13 are fragmentary perspective views showing further modifications for producing such article.

Figure 14 is a fragmentary perspective view of a further modification of form of stiffening member for receiving the screen to produce the article illustrated in Figure 5.

Figure 15 is a similar view of a further modification of the stiffening member for producing the article of Figure 2.

Figure 8:
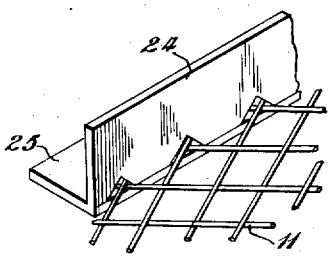
Figure 8 is a fragmentary perspective view showing one manner of producing the article illustrated in Figure 5.

There is illustrated in Figure 1 a portion of a unit structural member suitable for various uses, and which may represent one corner of a rectangular frame, consisting of suitable angles 10, to which there is attached at the junction of the flanges of the angles a body of open-mesh material 11, which may be woven wire, expanded metal, as will be understood hereafter. In this particular instance, channel portions of the angles are disposed at the outer sides of the frame, and the screen material is engaged with the angles or solid members at the outer sides of the angles formed by the junction of the two flanges 12 of the angles, and the screen material being extended in a plane which approximately bisects the angles at the junction of the flanges 12.

The angle 10 may be formed in various ways, being adapted to be assembled from two flat strips or ribbons of materials brought together at the proper angle as shown in Figures 2 and 3, and following, where it may be a stock L-angle rolled or shaped in one piece and, pierced, cut, or otherwise formed at the angle therein to receive the open-mesh material, as will be described more in detail hereafter. In producing the article of Figures 1 and 2, the respective strips intended to form the flanges 12, are brought into position as shown in Figure 2, after insertion of an edge portion of the screen material 11 therebetween, so that a small portion of the edge of the screen projects inwardly of the angle at the junction of the two flanges, after which a weld

13 is formed in accordance with any usual practices, but particularly including the deposit of metal within the angle immediately at the junction of the two flanges, in such manner that the molten metal surrounds the end portions of the wire of the screen, or the edge portion of the screen which is inserted and projected inwardly through the angle. In this way, the heat is absorbed from the weld body by the flanges 12 and dissipated by these, so that a minimum amount of heat is transmitted or accumulated in the extreme edge portion of the open-mesh material 11.

By the assembling method described, using two separate strips to form the flanges 12, the welding of the open-mesh material effects also the securement of the two flanges together, so that a complete angle is produced and the advantages utilized in the stiffening of the unit produced. In Figure 3, the angle 10' may be produced of two straps of metal struck together at the proper angle as illustrated, while the body of the screen extends inwardly from the angle, but with an edge portion which projects outwardly at the convex angle formed by the two flanges. Using strap material which has been trimmed with a flat edge substantially at right angles to the major plane of the strap, a recess is formed between the two edges of the flanges, into which the weld material 14 may be introduced, substantially as it was deposited in the device of Figure 2, surrounding the projected edge portion of the screen material, and the heat of the weld being transmitted to the flanges and dissipated thereby, with the same benefit in preserving delicate screen material from burning or excessive damage by heating of the weld. Utilizing a unit such as shown in Figure 2, it will readily be appreciated that a frame made up as described with angles 10 meeting at the corners, as shown in Figure 1, may be set upon a planiform surface, and filled with a Portland cement concrete aggregate of suitable kind, so that the concrete will penetrate through the open mesh material to the supporting surfaces, where it will spread and be confined by the angles 10, and the concrete may be introduced until its top surface lies flush with the upper edges of the angles 10, as will be appreciated. The slabs cast in this manner will thus be reinforced by the open mesh material, while its edge portions are protected against chipping by the edge portions of the flanges 12.

The units formed as in Figure 1, and other modifications to be indicated herein may also be set up on edge and connected to other elements to be supported as a fence or other enclosure.

In Figure 4, the manner of attaching the screen with relation to the flanges of an angle is illustrated, the screen material 11 being laid against the inner side of one of the flanges with its first portions projected outwardly past the abutting edge of the opposite flange, while a weld 15 is built up at one side of the angle around the projected edge portion of the screen material 11.

In Figure 5 the screen material is shown in the same plane with respect to the angle, as in Figure 4, but instead of being laid against the inner side of the bottom flange 12—A, and extended away from the angle beside that flange, the screen material is located outwardly of the angle, with its edge portion inserted inwardly between the flange 12' and the flange 12—A, the weld 16 being then built up at the inner side of the angle. In these last described two forms, the angle differs from the arrangement of Figures 2 and 3 in that in Figures 2 and 3 the flanges of the angles extend a common distance from the vertex of the angles, while in Figures 4 and 5, the upper flange 12' shown is butted against the inner side of the flange 12—A, or at least against the screen material inserted between the two. The beneficial result in the transmission or conduction of heat from the weld to the flanges, and its rapid dissipation, are gained in the last described forms of the article in the same manner as in the first two.

In Figures 6 and 7, structures are shown somewhat similar to that shown in Figures 1 and 2, and comprise identical metal strips 8 and 9, angularly disposed, bisected by the end portion of the mesh material or the like and welded at the root. The strip 8 is placed with the wide side thereof in parallel relation to the plane of the mesh material, in order to obtain substantially flush faced panels, in the same manner as flange 12—A in Figures 4 and 5, while the strip 9 is disposed at an acute angle to that strip 8 and diagonally in relation to the mesh instead of having a right angular disposition as shown by flange 12' in Figures 4 and 5. The width of the strips 8 and 9 may be varied in the manner so as to have the extreme longitudinal edges of said strips disposed in a common line lying at right angles to the web, or, the extreme edge of one strip may be disposed short from such line, as, for instance, said edge of strip 9 in Figures 6 and 7.

In Figure 8 there is shown a manner of forming one of the strips to be assembled from an angle stiffening member, in which the edge portion of one strip which is to be butted against the side of the other strip is notched at intervals corresponding to the spacing of the intersection of wires or other elements in the open mesh material, the material 11 being trimmed on the line slightly outward of the junction of the wires. After the trimming of the mesh material, its edge portion consisting of the intersections of the wires, is laid upon the inner side of the flange strip 25, while the notched flange member 24 is set down against the other flange and so that the respective wire intersections of the material 11 are located within the notches. The weld material is then applied within the angle, substantially as at 16, in Figure 5, securing the two pieces 24 and 25 together, and securing the material 11 to the assembled angle.

Figure 9:
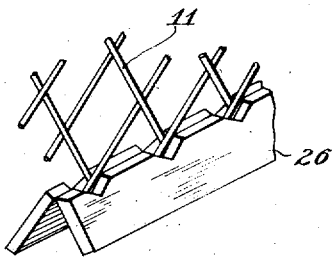
Figure 9 is a fragmentary perspective view showing another manner of forming the stiffening member to receive the screen material to produce an article corresponding to that shown in Figure 2.

In Figure 9, both strips 26 are notched in the manner shown in Figure 8, and instead of one of the strips being butted against the side of the other, they are both disposed at an angle to the plane of the material 11 and the weld is then formed substantially as shown in Figure 2.

In Figure 10, each flange 29 of the stiffening member or angle is shown as having extreme edge portions pressed alternately in opposite directions, so that when brought together in proper angular relations with the formed edges adjacent each other and with opposed salients of the formed edges in abutment, as at 30, slots 31 are formed between the oppositely pressed portions which are not in contact, and this permits the insertion of the intersections of the screen material 11 into respective slots, so that welding material may be formed at the inner side of the angle, substantially as shown in Figure 2, or otherwise according to the relation of the screen material 11 to the formed angle.

In Figure 11, it is shown how the strip members 32 may be formed for accommodation of a heavy wire mesh. In this construction the strips 32 are angularly arranged and spaced apart and small metal slugs 34 are placed between the strips and welded. Only occasional slugs will be required and these spaced apart as at 33, to permit entrance of the wire mesh, substantially in the relation shown in Figure 2, although the screen may be disposed in different planes with respect to the angle, as will be understood.

In Figure 12, the stiffening member may be formed of a serpentine or transversely corrugated strip 34' set at the proper angle to a straight strip 34*a*, so that the salients of the corrugations abut said opposed straight strip. The corrugations of the strip may occur throughout their length or at intervals, as desired.

In Figure 13, there is shown the manner of forming the stiffening member in one piece, this consisting of strip material having opposite edge portions bent on a longitudinal medial line of the piece so as to dispose the edge portions at right angles to each other, the junction material of the strip at its central part being struck out at intervals to form opposed tongues 36 sufficiently separated to form openings through the stiffening member at the angle, and to receive wire intersections between the tongues 36. Welds are applied at the inner side of the piece around the wire intersections, so that the latter are joined to the angle piece 35 thus formed, and said tongues may serve as useful means to increase the mass of the material at edges of said openings wherein the welding heat can be more readily absorbed, combined with infiltration of the welds between such opposed tongues and which offers advantages in the use of thinner material usually intended in such cases.

In Figure 14, a lower flange strip 37 is shown, having positioned thereon, in spaced relation, metal slugs 39, and an upper strip 38 is then set upon the slug 39, at right angles to the strip 37 and the slugs. The screen material 11 is laid with its edge portion intersections upon the flange strip 37 and set between the spaced slugs. The weld material is then applied at the inner side of the angle to join the two strips and the screen material, forming an angle corresponding to that shown in Figure 5.

In Figure 15, specially formed strip material is utilized to produce the angle stiffness, in this case each strip being formed with any suitable number of alternated offset flat portions 40, and inwardly curved sections 41, so that when two strips are brought together with the inwardly curved portions opposed to each other, the latter may contact, and form elongated slots 42 between the oppositely disposed flat portions 40. In these slots the wire intersections of the screen material 11 may be respectively inserted and secured as before indicated.

Figure 17:
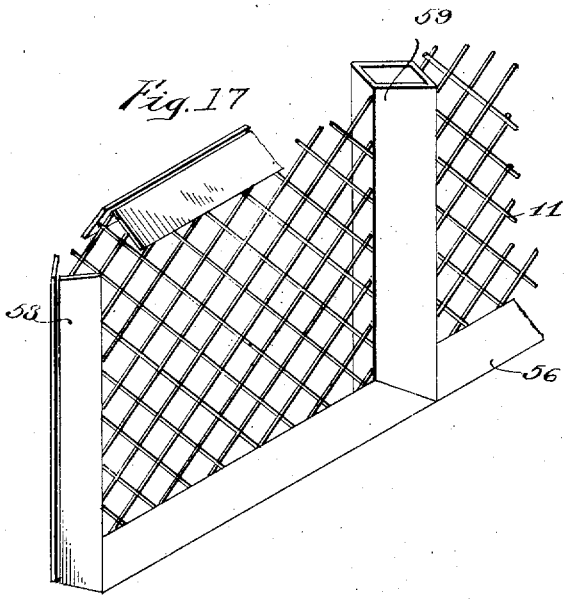
Figures 16 and 17 are perspective views to illustrate the various uses of the structural elements of Figures 2 and 3 in a screen or similar partition structures.
Figure 16:
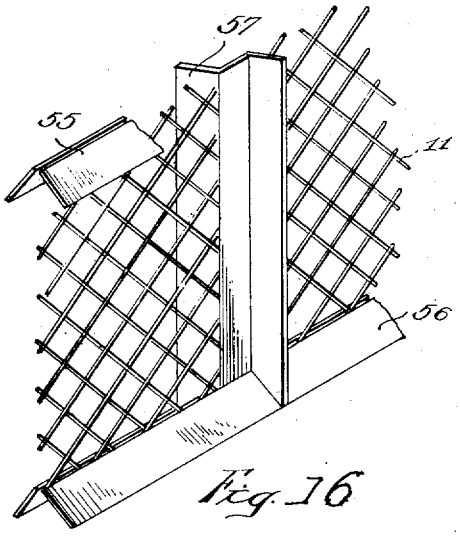

In Figures 16 and 17, combinations of frame structures are shown, supporting separate screen sections 11 and including, at top and bottom, horizontal edge members 55 and 56 which are formed in accordance with the structures of Figures 3 and 2, respectively. In Figure 16, there also is shown a vertical Z-shaped intermediate reinforcement with edge portions of separate screen sections 11 secured thereto at an upright medial portion and screen bodies oppositely extended therefrom. In Figure 17, there is shown an upright end reinforcement 58 corresponding in structure to that of Figure 3, and a central post 59 of hollow rectangular form is employed, composed of opposed and united frame members, of a type such as seen in Figure 2, with channel portions presented towards each other. The downwardly directed flanges in the top and bottom edgings 55 and 56, as presented in Figures 16 and 17, will prevent adherence of excessive foreign matter or moisture in inside or outside structures respectively, as will be readily appreciated.

From the foregoing, it will be seen that the degree of angular relation of the two bisected strips may be subject to considerable variations for desired purposes, and that it is a general advantage of welded construction that great freedom of design is at disposal, and in the present case, the angular degree may be disposed in such way as to obtain rigidity of panels in a plane common with the mesh or may be altered to reach better rigidity in a direction substantially at right angles to the mesh material.

While I have shown my invention with great particularity, in its various forms, it is to be understood that these are purely exemplary, and that various other modifications may be made, as well as changes in the sizes, proportions and construction of parts, as well as combination of equivalent elements, without departing from the spirit of the invention, as more particularly set forth in the claims following hereafter.

I claim:

1. A structural device comprising a mesh web and a frame support therefor having an elongated support member being substantially of angular form in transverse section, said support member having elongated sections extended longitudinally of the member with sides forming flanges in the member disposed substantially in divergent relation to each other to define said angular form, said mesh web having a marginal portion engaged between said sections at the junction thereof and exposed at a side of said member lying away from the body of the mesh web, welding material employed to secure said marginal portion of the web to said support member, and said welding material being located substantially at said side of the member lying away from the body of the web.

2. The structure of claim 1 in which said divergent sides of the sections are directed away from the body of said mesh web in a manner so as to have said side lying away from said body defined by the concave side of the support.

3. The structure of claim 1 in which said sections are separate pieces arranged in a manner so as to have respective longitudinal portions thereof opposed and lying in lateral adjacency to each other with said marginal web portion engaged therebetween and said separate sections and web portion secured together by said welding material.

4. The structure of claim 1 in which said sections are separate pieces arranged in a manner so as to have respective longitudinal edge portions thereof opposed and lying in lateral adjacency to each other with said marginal web portion engaged therebetween and with the convex side of said member defining said side lying away from the body of the web, and narrow ends of said sections at said opposed longitudinal edge portions lying at an angle to each other so as to form an external recess longitudinally of said member at said convex side with said welding material located substantially therein.

5. A structural member comprising a mesh web to be supported within a frame, having a frame element consisting of flat bar members with longitudinal edge portions disposed in angular relation to each other and receiving an edge portion of said web therebetween so as to be exposed at a side of said frame element opposite the body of said mesh web, said frame element including at least one bar member disposed at an angle to said mesh web, welding material at contacting portions of said bar members and said mesh web, and said welding material being located at said side of said frame element opposite the body of said mesh web.

6. The structure of claim 5 in which said bar members are positioned at an angle and in a plane parallel to said mesh web respectively.

7. A structural device comprising a mesh web and a frame support therefor having an elongated support member being substantially of angular form in transverse section, said support member having separate elongated sections extended longitudinally of the member with sides disposed substantially in divergent relation to each other in order to define said angular form, one elongated section having the transverse portion disposed substantially in the direction of the plane of said mesh web and a respective marginal portion of the web being laid against the inner side of the section, another elongated section disposed substantially at an angle to said plane having a longitudinal edge portion directed to said marginal web portion so that said web is engaged between the sections and exposed at a side of said support member lying away from the body of the web, and welding material employed substantially at said side lying away from said body to secure said separate sections and said marginal web portion to each other.

8. The structure of claim 7 in which said angular disposition of said section to the plane of the web is defined substantially by an acute angle.

9. A structural element comprising a web member of flexible material and a frame element therefor comprising an elongated member having respective flange portions disposed at an angle to each other, said web member being engaged between the flange portions substantially at the vertex of the frame element, and said frame element being formed with a multiplicity of longitudinally spaced openings substantially at said vertex, said web member being a mesh structure with projecting portions extended through said openings and the ends of the mesh elements exposed at a side of the frame element, and welding material engaged and united with the frame element substantially at the vertex of the angle and said projecting portions of the mesh.

10. The structure of claim 9 in which the ends of said mesh elements are exposed at the concave side of the frame element with said welding material located substantially at a side of said frame element lying away from the body of said web.

11. A structural member comprising a mesh sheet or web, the elements of which bounding openings in the mesh structure adjacent the edges constitute projecting elements spaced longitudinally of the edges of the mesh member, and a frame element therefor, consisting of an elongated member formed to dispose opposite longitudinal sides substantially in angular relation to each other, said frame element having a multiplicity of longitudinally spaced apertures substantially at the junction of said sides and said apertures being flanked by extensions struck from the junction material, respective projecting elements of said mesh member being engaged in said apertures and between respective extensions thereof and united therewith by welding material.

12. A structural member comprising a mesh web, the elements of which bounding openings in the mesh structure adjacent the edges constitute projecting elements spaced longitudinally of the mesh member, and a frame element therefor comprising elongated sections with sides forming flanges in said frame element arranged in substantially angular relation forming a root opening, slugs welded at spaced intervals within the root opening, respective projecting portions of the mesh being engaged in the root openings between the slugs and weld materials for securing the mesh to said frame element, as and for the purposes described.

13. A structural element of the character described comprising a mesh web supported within a frame having a frame member of angular form in transverse section and embodying two lateral flanges disposed at an acute angle to each other, and said frame member being apertured at its angle vertex and having end portions of said mesh web extended therethrough and oppositely exposed, and welding material engaged to unite said frame member with said web at points of contact, and said frame member having one flange positioned in a plane parallel to said mesh web, and the longitudinal extremities of said frame member lying substantially in a common line extended at right angles from the plane of said mesh web.

14. A structural element of the character described comprising a mesh web supported within a frame having a frame member of angular form in transverse section and embodying two lateral flanges disposed at an angle to each other, and said frame member being apertured at its angle vertex and having end portions of said mesh web extended therethrough and oppositely exposed, and welding material engaged to unite said frame member with said web at points of contact, and said mesh web being extended from the convex side of the frame member and located in a plane equally bisecting the angle of said flanges.

15. A structural member comprising a mesh sheet or web, the elements of which bounding openings in the mesh structure adjacent the edges constitute projecting elements spaced longitudinally of the edges of the mesh member, and a frame element therefor, consisting of two elongated lateral members having sides forming flanges in the element arranged in angular relation to each other thereby defining a longitudinally directed channel in the element at a side thereof, said members having respective longitudinal portions opposed at the angle vertex and spaced apart, at least one of said elongated members being deformed from a straight longitudinal line by a warpage in the material with sections therein inwardly and outwardly directed relative to each other so as to obtain said spacing between said opposed portions of the members and a closure of said spacing at a location lying intermediately between projecting elements of the mesh, said projecting elements of said mesh engaging between said spaced apart portions and being exposed at a side of said frame element lying away from the body of the web, and welding material employed to unite the mesh and said members, as and for the purposes described.

FREDERICK KAUTZ.

REFERENCES CITED

The following references are of record in the file of this patent:

UNITED STATES PATENTS

| Number | Name | Date |
|---|---|---|
| 1,593,218 | McClure | July 20, 1926 |